(12) United States Patent
Hehl

(10) Patent No.: US 6,190,154 B1
(45) Date of Patent: Feb. 20, 2001

(54) INJECTION-MOULDING MACHINE FOR PROCESSING PLASTICIZABLE COMPOUNDS

(76) Inventor: Karl Hehl, Arthur-Hehl-Strasse 32, D-72290 Lossburg (DE)

( * ) Notice: Under 35 U.S.C. 154(b), the term of this patent shall be extended for 0 days.

(21) Appl. No.: 09/230,858

(22) PCT Filed: Jul. 25, 1997

(86) PCT No.: PCT/EP97/04042

§ 371 Date: Feb. 2, 1999

§ 102(e) Date: Feb. 2, 1999

(87) PCT Pub. No.: WO98/05485

PCT Pub. Date: Feb. 12, 1998

(30) Foreign Application Priority Data

Aug. 3, 1996 (DE) .............................................. 196 31 432

(51) Int. Cl.[7] .................................................. B29C 45/10
(52) U.S. Cl. ........................... 425/190; 425/451; 425/575
(58) Field of Search .................................. 425/575, 589, 425/451, 574, 576, 190

(56) References Cited

U.S. PATENT DOCUMENTS

| 3,086,244 | * | 4/1963 | Hehl | 425/586 |
|---|---|---|---|---|
| 3,350,746 | * | 11/1967 | Blumer | 425/547 |
| 3,373,459 | * | 3/1968 | Hehl | 425/595 |
| 3,564,658 | * | 2/1971 | Hehl | 425/188 |
| 3,720,492 | * | 3/1973 | Hehl | 425/107 |
| 3,751,203 | * | 8/1973 | Hehl | 425/190 |
| 3,761,214 | * | 9/1973 | Hehl | 425/192 |
| 3,852,010 | * | 12/1974 | Hehl | 425/192 |
| 3,909,173 | * | 9/1975 | Latter | 425/192 |
| 4,005,961 | * | 2/1977 | Manceau | 425/190 |
| 4,430,059 | * | 2/1984 | Bielfeldt | 425/190 |
| 4,487,569 | * | 12/1984 | Hehl | 425/575 |
| 5,753,153 | * | 5/1998 | Choi | 264/40.5 |

FOREIGN PATENT DOCUMENTS

| 530 260 | 12/1972 | (CH) . |
|---|---|---|
| 3214728 | 11/1983 | (DE) . |
| 2 099 898 | 3/1972 | (FR) . |
| 2 525 526A | 10/1983 | (FR) . |

* cited by examiner

Primary Examiner—Harold Pyon
Assistant Examiner—Emmanuel Luk
(74) Attorney, Agent, or Firm—Cantor Colburn LLP

(57) ABSTRACT

In the case of an injection molding machine for processing plasticizable materials, a structural unit, which includes at least a movable mold carrier, a stationary mold carrier and a closing arrangement of a mold closing unit, is supported on support elements on a machine base. A pivotal axis, about which the structural unit is pivotable, extends transversely relative to a closing axis. A drive unit is provided for pivoting and for displacing the structural unit and is connected pivotally to the machine base and at an articulation point to the structural unit, which articulation point is disposed at a spacing from a pivotal axis. Upon transferring the structural unit from the horizontal position into the vertical position, the drive unit initially pivots the structural unit and then also displaces it.

8 Claims, 5 Drawing Sheets

INJECTION-MOULDING MACHINE FOR PROCESSING PLASTICIZABLE COMPOUNDS

REFERENCE TO RELATED APPLICATIONS

The present application claims the priority of German Patent Application 196 31 432.1, filed on Mar. 8, 1996, the disclosed contents of which are hereby expressly used also for the subject-matter of the present application.

TECHNICAL FIELD

The invention relates to an injection molding machine for processing plasticisable materials such as, for example, plastics materials, pulverulent materials or ceramic materials according to the preamble of claim 1.

PRIOR ART

Such an injection molding machine is known, for example, from DE-A 20 20 336, which forms the basis for the preamble of claim 1, or from DE-C 32 14 728, not only to permit injection into the cavity of the injection mold by means of an injection molding unit via an injection opening provided in the mold, but to inject also into the parting plane, if necessary. However, a pivotal movement of the mold closing unit into a vertical position is advantageous, even when working with inserts. The basic provisions therefor are hereby simultaneously created to inject via the central sprue opening and into the parting plane by means of two injection molding units. For this purpose, it is necessary to pivot the mold closing unit from the horizontal position, in which the closing axis of the mold closing unit coincides with the injection axis of the injection molding unit, into a vertical position, in order to permit access to the parting plane. However, since the pivotal axis of the entire mold closing unit, disposed on a pivotal frame, cannot extend up to the level of the injection axis, it is necessary to pivot the injection molding unit via a first mechanical or manual drive and then to displace the parting plane, by means of a second unit in the form of a worm drive, to a level where the injection molding unit can inject. Apart from the outlay required therefor, this has the consequence that there is no end position certainty, since the optimum pivotal position only needs to be set during the pivoting-back movement into the horizontal position, more especially, so that the various drives are actuated several times.

It was hitherto assumed that a pivotal movement and a reliable displacement with the same drive unit are not possible. Basically, for an optimum pivotal movement without displacement if possible, it would be necessary to position the pivotal axis on a level with the closing axis. However, limits are set for these displacements of the pivotal axis by the mold clamping chamber, since otherwise a transfer of the tool to the mold clamping chamber is hindered. In prior art, therefore, the pivotal axes were disposed as low as possible. On the other hand, the space below the mold clamping chamber was to be kept free for the disposal of the injected parts and sprues, so that even this space was not occupied by a drive unit. In view of this, an attempt was made to effect the rotation about a pivot which lies, if possible, externally of a projection of the mold clamping chamber, and, in any event, to dispose the displacement mechanism in a space-saving manner laterally of the mold clamping chamber.

STATEMENT OF THE INVENTION

On the basis of this prior art, the basic object of the present invention resides in developing further an injection molding machine of the initially mentioned type, so that a pivotal movement into the various positions of the mold closing unit is rendered possible in an economical manner with as few driving means as possible.

This object is achieved by an injection molding machine having the features of claim 1.

Only a single drive is now still basically required for the pivotal movement, since the pivotal movement and the displacement, possibly required; are accomplished by one and the same drive unit. The drive unit is pivotally disposed for such purpose, the desired effect of accomplishing all of the required movements with only one unit being achieved because of the ratio in respect of the spacing between the pivotal axis and the articulation point of the drive unit. Because of a displacement of the drive unit into a region which appeared unsuitable in prior art, it now becomes possible to dispose the operational axis of the drive unit so that it can simultaneously effect the pivotal movement, and so that it is also capable, when a structural unit is pivoted, to apply the forces for displacing the structural unit.

Further advantages are found in the sub-claims.

SHORT DESCRIPTION OF THE DRAWINGS

BEST WAY TO ACCOMPLISH THE INVENTION

The invention is now explained more fully by way of example with reference to the accompanying drawings. However, the embodiments are merely examples which are not to limit the inventive concept to an actual specific arrangement.

Figure 1:
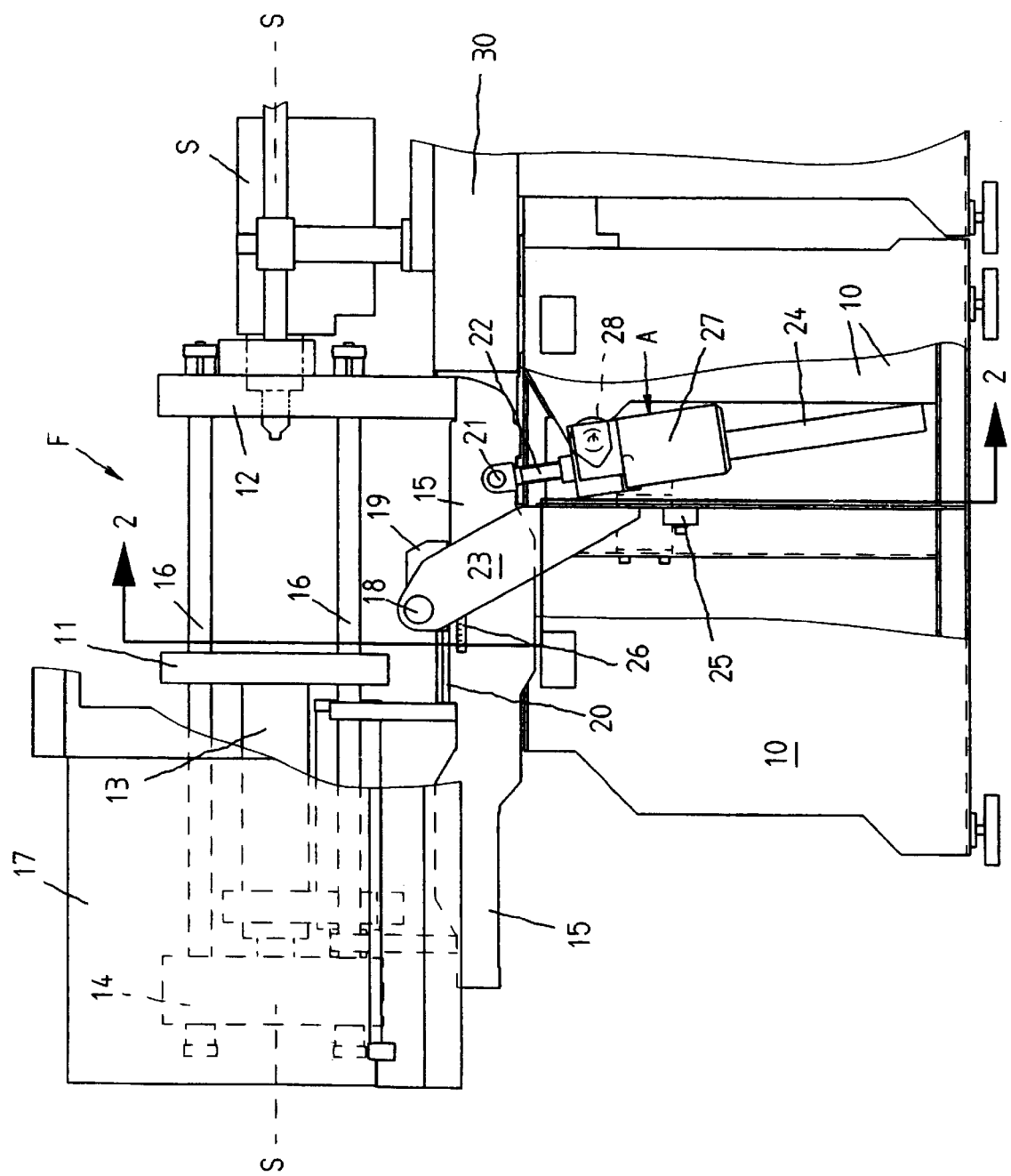
FIG. 1 is a side elevational view of the mold closing side of the injection molding machine with the mold closing unit in the horizontal position.
Figure 3:
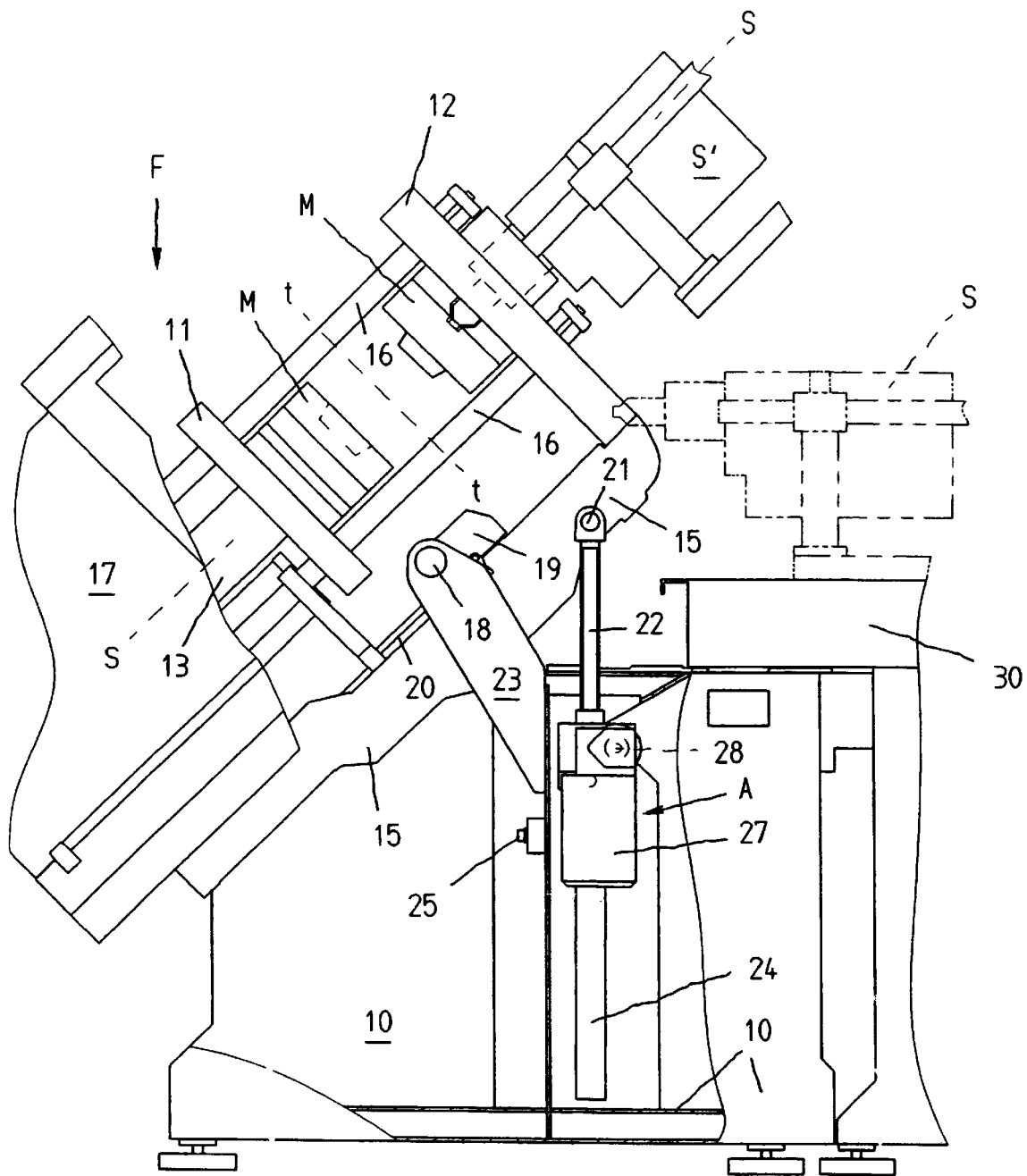
FIG. 3 is a view, corresponding to FIG. 1, with a mold closing unit shown in the pivotal position.

FIG. 1 illustrates a portion of an injection molding machine, more especially a plastics injection molding machine, which is intended to process plasticisable materials such as, for example, plastics materials, pulverulent materials or ceramic materials. The plasticising cylinder of the injection molding unit S is thus indicated at the top right-hand corner and traverses the stationary mold carrier of the mold closing unit. The mold closing unit S and the mold closing unit F are disposed on a machine base 10. The mold closing unit accommodates a mold M between a movable mold carrier 11 and a stationary mold carrier 12 (FIG. 3). The movement of the movable mold carrier 11 is effected via a closing arrangement 13 which operates, for example, hydraulically or electromechanically. The closing arrangement moves the movable mold carrier 11 of the mold closing unit F along a closing axis s—s towards the stationary mold carrier 12 and away from said stationary mold carrier.

In order to permit the pivotal movement of the mold closing unit, said unit is disposed on support elements 15, which include at least the movable mold carrier 11, the stationary mold carrier 12 and the closing arrangement 13 of the mold closing unit F to form a structural unit. The closing arrangement 13 is supported on a supporting element 14, which is connected to the stationary mold carrier 12 via bars 16. Instead of these bars, differently shaped force transmitting elements may also be provided, which permit, for example, free access to the mold clamping chamber and thus extend around said chamber.

The structural unit is supported on the machine base 10. The structural unit is pivotable about a pivotal axis, which extends transversely relative to the closing axis s—s, through at least 90° relative to the machine base 10, preferably from a horizontal position shown in FIG. 1 into a vertical position shown in FIG. 5. In order to permit, if necessary, a displacement of the structural unit parallel to the closing axis s—s, guides 20 are provided. This is especially necessary in order to bring the parting plane, for injection into the parting plane, to a level where the injection axis of the injection molding unit S lies. In order to effect the transfer of the mold closing unit, means are therefore provided for the pivotal movement of the structural unit about the pivotal axis 18, and means are provided for the displacement of the structural unit along the guides 20. A drive unit A is provided as the means for the pivotal movement and for the displacement, if required, of the structural unit and is connected pivotally to the machine base 10 and at an articulation point 21 to the structural unit. In such case, the articulation point 21 is disposed at a spacing from the pivotal axis 18.

It has proved advantageous for the articulation point 21 to lie above a line which extends through the pivotal axis 18 and the pivot point 28 of the drive unit A. In order, now, to effect the pivotal movement of the structural unit initially and then to effect the displacement with the same drive unit A, the operational direction of the linear drive, which is configured as drive unit A, extends virtually at right angles to the guides 20 in the case of a horizontally disposed structural unit. The linear moving means 22 of the drive unit co-operates with the support element 15 of the structural unit. For transferring the structural unit from the horizontal position of FIG. 1, the structural unit is initially pivoted into a vertical position shown in FIG. 4 and then upwardly displaced in the guides 20. In the horizontal position of the structural unit, the pivotal axis 18 lies above the articulation point 21 on a supporting arm 23 supported on the machine base 10. On the other hand, the pivotal axis is connected to a bearing block 19, which engages in the guide 20 and is thus connected to the support elements 15. FIG. 1 shows that the pivotal axis 18, in the horizontal position of the structural unit, is disposed with a greater spacing from the stationary mold carrier 12 than the articulation point 21. The disposition of the pivotal axis 18, the pivot point 28 and the articulation point 21 is so selected that the desired sequence of pivotal and displacement movements results. This disposition is so optimized that access to the mold clamping chamber is not adversely affected.

In the case of a horizontally lying mold closing unit, the drive unit A and the pivotal axis 18 lie in the region of the vertical projection of the mold clamping chamber between movable mold carrier 11 and stationary mold carrier 12. Both in the case of a horizontally lying mold closing unit F and in the case of a vertically extending mold closing unit F, the pivotal axis 18 and the articulation point 21 likewise each lie in the region of a projection of the mold clamping chamber defined by the mold carriers in their respective open position. A vertical projection is involved in the case of a horizontally lying mold closing unit, and a horizontal projection is involved in the case of a vertically extending mold closing unit. The pivotal movement and displacement, if necessary, are facilitated by the disposition of the axes in this region, which does in fact protrude into the mold clamping chamber but does not hinder an introduction of the mold M.

Figure 4:
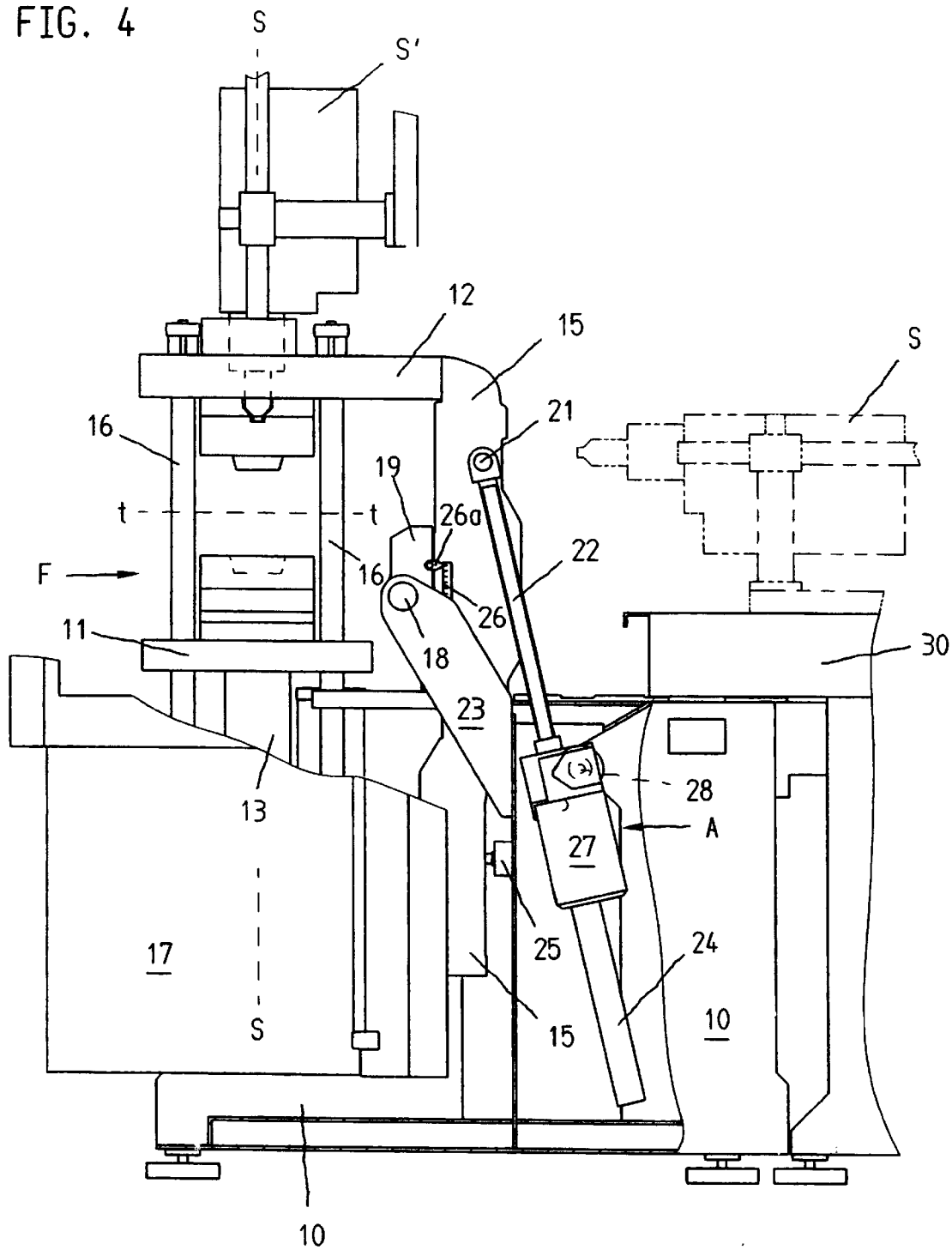
FIG. 4 is a view, according to FIG. 1, wherein the mold closing unit is transferred into the vertical position.
Figure 5:
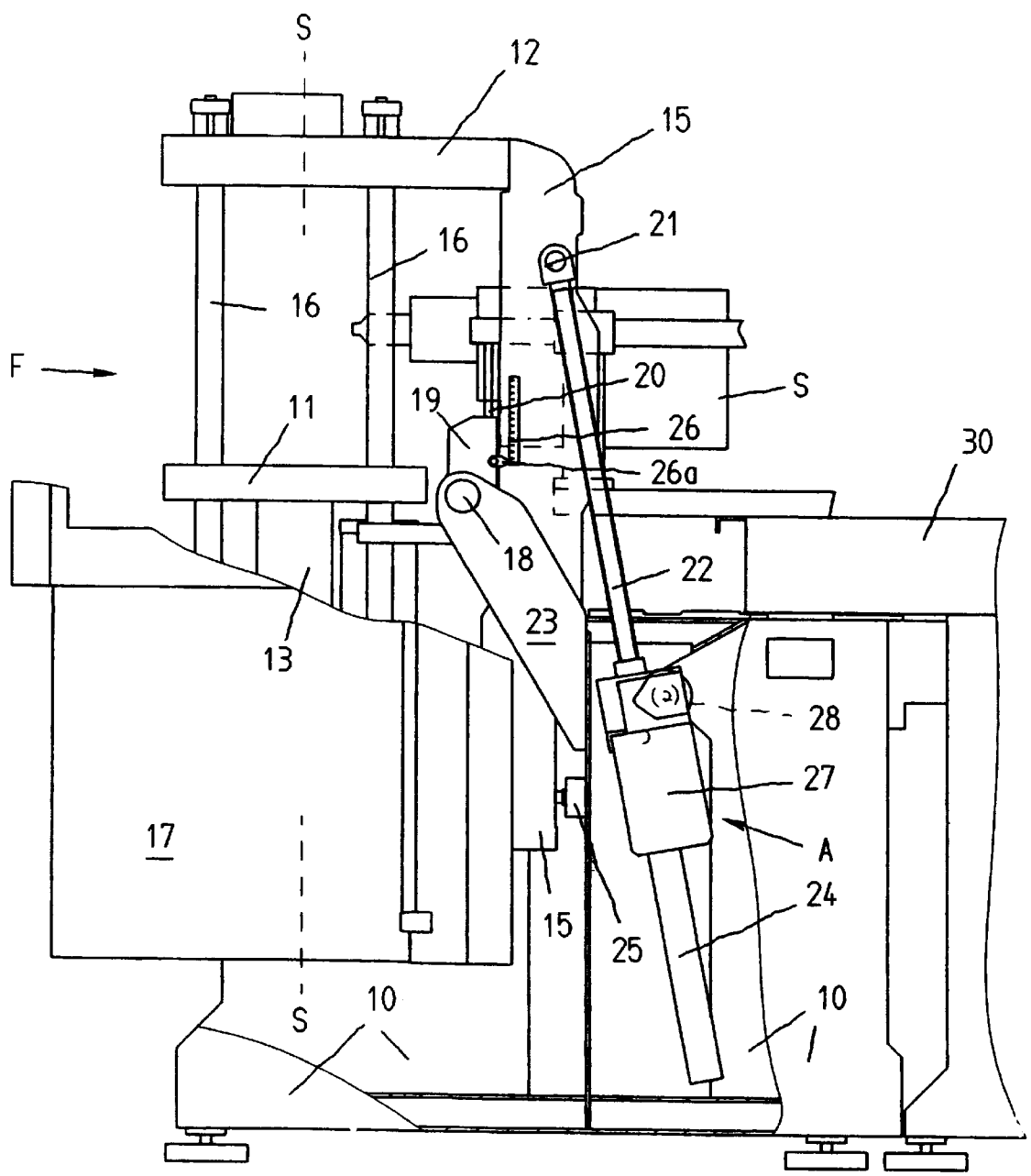
FIG. 5 is a view, according to FIG. 1, having a vertically extending mold closing unit, wherein the parting plane is set to the level of the injection molding unit.

If the drive unit A is actuated from a position according to FIG. 1, the actuation of the drive unit leads to the structural unit being initially pivoted into a position according to FIG. 3. Upon further actuation, the articulation point likewise moves to the left in FIG. 3, so that a position according to FIG. 4 results. In this position, the mold closing unit abuts with the bearing block against the end stop in the vicinity of the pivotal axis 18. In such case, especially when compared with FIG. 5, FIG. 4 shows that, in this position, an injection from the injection molding unit S is not yet possible under circumstances which are substantially determined by the dimensions of the mold. For such purpose, the mold closing unit does in fact still have to be upwardly displaced, and such is also effected with the same drive unit. The pivotal movement itself is terminated as soon as the support element 15 abuts against the abutment 25. Upon further actuation of the drive unit A, another displacement of the mold closing unit can then only occur upwardly for the purpose of setting the parting level of the parting plane. However, during the return to the horizontal position, this leads to the displacement movement also initially being effected, solely because of the force of gravity, for such a time until the bearing block 19 abuts against an end stop in the vicinity of the pivotal axis 18, so that a pivotal movement is only still introduced hereinafter, which automatically then leads to the optimum position of the mold closing unit for a horizontal injection.

Figure 2:
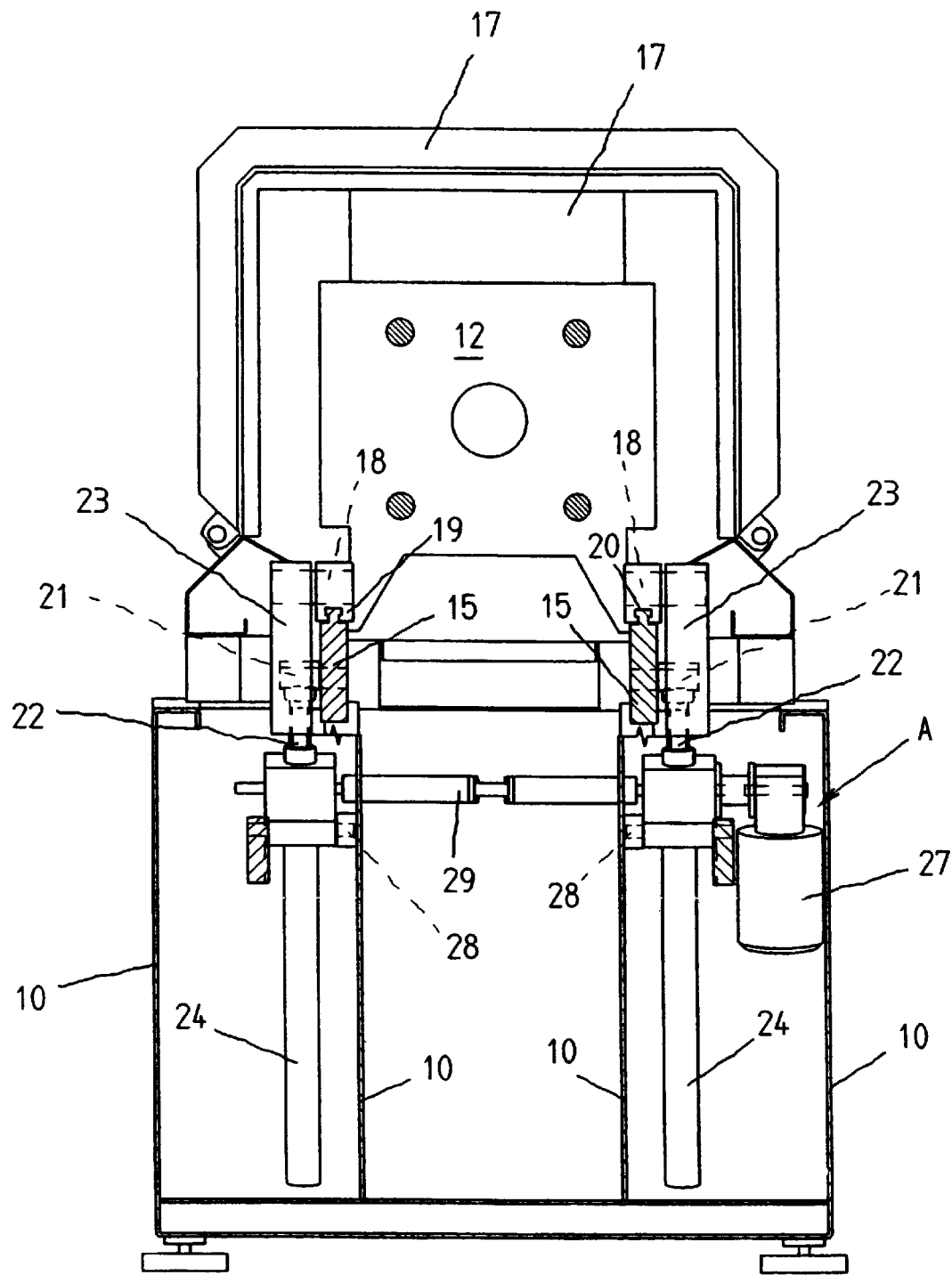
FIG. 2 is a cross-sectional view taken along the line 2—2 of FIG. 1.

In the embodiment, an electromechanical spindle drive is provided as the drive unit, wherein, according to FIG. 2, a motor 27 synchronously drives two spindle drives via a drive shaft 29. Instead of the drive shaft 29, an electronic shaft may also ensure a co-ordination between the spindle drives, if a particular motor is provided for each spindle drive. Also, of course, only one motor may be used, which should then, however, preferably centrally co-operate with the mold closing unit. Instead of the electromechanical drive, other types of drives may also be provided. Alternatively, the machine may also be provided in a simplified embodiment, in which the electromechanical drive is replaced by a manual drive, e.g. by means of a crank. With such an embodiment, more especially, the scale 26 and an indicator 26a are then advantageous, since the dimension for the vertical adjustment of the parting plane can be positively determined thereby. An optimum pivotal movement results when the pivotal axis 18 is positioned as far as possible on the closing axis s—s in the horizontal position, or respectively in the vertical position on an axis extending through the parting plane t—t. In this case, the displacement can possibly be eliminated, but a more accurate setting to various mold dimensions is possible if the corresponding guides 20 are provided. According to FIG. 4, an injection molding unit S' may be pivoted with the stationary mold carrier 12, while a second injection molding unit S is disposed on a table 30 and can be applied to the injection mold M once the parting plane has been set on this table 30.

A protective covering 17 is also pivoted with the structural unit and the mold closing unit F, FIGS. 3 and 4 showing that the pivotal movement into a recess in the machine base 10 is effected. The linear moving means 22—a spindle in the embodiment—is protected from contamination by a protective element 24.

It is self-evident that this description can be subjected to the most varied modifications, changes and adaptations, which vary within the range of equivalents to the appending claims.

What is claimed is:

1. An injection molding machine for processing plasticisable materials, comprising
   a machine base,
   a mold closing unit, which is disposed on the machine base and accommodates a mold between a movable mold carrier and a stationary mold carrier,
   a closing arrangement for moving the movable mold carrier of the mold closing unit along a closing axis towards the stationary mold carrier and away from the stationary mold carrier,
   support elements, which form a structural unit, supported on the machine base, at least with the movable mold carrier, the stationary mold carrier and the closing arrangement of the mold closing unit,
   a pivotal axis, which extends transversely relative to the closing axis, and about which the structural unit is pivotable through at least 90° relative to the machine base,
   guides for displacing the structural unit parallel to the closing axis,
   at least one injection molding unit (S,S') for injecting the plasticisable material into the mold (M),
   at least one drive unit for pivoting the structural unit about the pivotal axis, the drive unit being pivotally connected to the machine base and at an articulation point to the structural unit, which articulation point is disposed at a spacing from the pivotal axis,
   a linear moving mechanism displacing the structural unit along the guides, the linear moving mechanism being pivotally mounted on the structural unit, wherein the linear moving mechanism is part of the drive unit displacing the structural unit and also providing the pivotal movement of the structural unit, and in that in transferring the structural unit from a horizontal position, where the mold closing unit closes the mold horizontally, the linear moving mechanism pivots the structural unit initially into a vertical position and then displaces such in the guides.

2. An injection molding machine according to claim 1, wherein the operational direction of the linear drive, configured as drive unit, extends virtually at right angles to the guides when the structural unit is horizontally disposed.

3. An injection molding machine according to claim 1, wherein the pivotal axis is disposed on a supporting arm, supported on the machine base, when the structural unit is in a horizontal position above the articulation point.

4. An injection molding machine according to claim 1, wherein, when the structural unit is in the horizontal position, the pivotal axis is disposed at a greater spacing from the stationary mold carrier than the articulation point.

5. An injection molding machine according to claim 1, wherein the drive unit, upon actuation, pivots the structural unit for such a time until it abuts against an abutment on the machine base, and in that, upon further actuation of the drive unit, the structural unit is displaced in the guides.

6. An injection molding machine according to claim 1, further including a scale provided on one of two elements, consisting of a bearing block and the support elements, and an indicator is provided on the other of these two elements, the level of a parting plane of the mold being defined by said two elements, in which plane the horizontally injecting injection molding unit injects.

7. An injection molding machine according to claim 1, wherein two electromechanical spindle drives are provided as the drive unit and are driven by a common motor.

8. An injection molding machine for processing plasticisable materials comprising:
   a machine base,
   a mold closing unit, which is disposed on the machine base and accommodates a mold between a movable mold carrier and a stationary mold carrier;
   a closing arrangement for moving the movable mold carrier of the mold closing unit along a closing axis towards the stationary mold carrier and away from the stationary mold carrier,
   support elements, which form a structural unit, supported on the machine base, at least with the movable mold carrier, the stationary mold carrier and the closing arrangement of the mold closing unit,
   a pivotal axis, which extends transversely relative to the closing axis, and about which the structural unit is pivotable through at least 90° relative to the machine base,
   guides for displacing the structural unit parallel to the closing axis,
   at least one injection molding unit for injecting the plasticisable material into the mold,
   at least one drive unit for pivoting the structural unit about the pivotal axis, the drive unit being pivotally connected to the machine base and at an articulation point to the structural unit, which articulation point is disposed at a spacing from the pivotal axis, and
   a linear moving mechanism displacing the structural unit along the guides, the linear moving mechanism being pivotally mounted on the structural unit,
   wherein the linear moving mechanism is part of the drive unit displacing the structural unit and also providing the pivotal movement of the structural unit, and in that in transferring the structural unit from a horizontal position, where the mold closing unit closes the mold horizontally, the linear moving mechanism pivots the structural unit initially into a vertical position until the structural unit abuts against an abutment and then the linear moving mechanism displaces the structural unit in the guides.

* * * * *